United States Patent
Zhang et al.

(10) Patent No.: US 11,013,030 B2
(45) Date of Patent: May 18, 2021

(54) DATA PROCESSING METHOD, APPARATUS, AND SYSTEM

(71) Applicant: HUAWEI TECHNOLOGIES CO., LTD., Guangdong (CN)

(72) Inventors: Gongzheng Zhang, Hangzhou (CN); Yunfei Qiao, Hangzhou (CN); Rong Li, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 87 days.

(21) Appl. No.: 16/195,521

(22) Filed: Nov. 19, 2018

(65) Prior Publication Data

US 2019/0090270 A1 Mar. 21, 2019

Related U.S. Application Data

(63) Continuation of application No. PCT/CN2017/077506, filed on Mar. 21, 2017.

(30) Foreign Application Priority Data

May 20, 2016 (CN) .......................... 201610341603.7

(51) Int. Cl.
*H04W 74/00* (2009.01)
*H04L 5/00* (2006.01)
*H04L 27/26* (2006.01)

(52) U.S. Cl.
CPC ......... *H04W 74/006* (2013.01); *H04L 5/0007* (2013.01); *H04L 5/0032* (2013.01);
(Continued)

(58) Field of Classification Search
CPC . H04W 74/006; H04W 74/004; H04W 74/00; H04L 5/0007; H04L 5/0048; H04L 5/0051; H04L 5/0062; H04L 27/2613
See application file for complete search history.

(56) References Cited

U.S. PATENT DOCUMENTS

| | | | |
|---|---|---|---|
| 2008/0287155 A1 | 11/2008 | Xu et al. | |
| 2010/0098005 A1* | 4/2010 | Lee | H04L 1/1671 370/329 |

(Continued)

FOREIGN PATENT DOCUMENTS

| | | |
|---|---|---|
| CN | 101116005 A | 1/2008 |
| CN | 101278585 A | 10/2008 |

(Continued)

OTHER PUBLICATIONS

3GPP TR 36.888 V12.0.0 (Jun. 2013),3rd Generation Partnership Project;Technical Specification Group Radio Access Network;Study on provision of low-cost Machine-Type Communications (MTC) User Equipments (UEs) based on LTE (Release 12),total 55 pages.
(Continued)

*Primary Examiner* — Shukri Taha
(74) *Attorney, Agent, or Firm* — Womble Bond Dickinson (US) LLP

(57) ABSTRACT

Embodiments of the present application provide a data processing method, a device, and a system. The method includes: determining a pilot group, where the pilot group includes at least two elements; generating a plurality of data frames including a first data frame and a second data frame, where each data frame carries information used to indicate the pilot group determined by user equipment; and sending a plurality of resource blocks to a network device, where a first resource block carries the first pilot and the first data frame, and a second resource block carries the second pilot and the second data frame.

6 Claims, 7 Drawing Sheets

(52) U.S. Cl.
CPC .......... *H04L 5/0048* (2013.01); *H04L 5/0051* (2013.01); *H04L 5/0062* (2013.01); *H04L 27/2613* (2013.01); *H04W 74/004* (2013.01)

(56) References Cited

U.S. PATENT DOCUMENTS

| | | | |
|---|---|---|---|
| 2010/0150056 | A1 | 6/2010 | Iwai et al. |
| 2011/0026482 | A1* | 2/2011 | Li ..................... H04L 5/0048 370/329 |
| 2015/0289292 | A1 | 10/2015 | Sun et al. |
| 2016/0056937 | A1* | 2/2016 | Yun ..................... H04L 5/0016 370/329 |
| 2016/0105910 | A1* | 4/2016 | Wang ............... H04W 56/0045 370/329 |
| 2016/0323923 | A1 | 11/2016 | Wei |
| 2017/0245307 | A1 | 8/2017 | Liu et al. |

FOREIGN PATENT DOCUMENTS

| | | |
|---|---|---|
| CN | 101682375 A | 3/2010 |
| CN | 104661313 A | 5/2015 |
| CN | 104702554 A | 6/2015 |
| CN | 104812086 A | 7/2015 |
| CN | 104981022 A | 10/2015 |
| CN | 105517182 A | 4/2016 |
| EP | 1916856 A1 | 4/2008 |
| EP | 2874363 A1 | 5/2015 |
| EP | 3297239 A1 | 3/2018 |
| WO | 2017166373 A1 | 10/2017 |

OTHER PUBLICATIONS

3GPP TS 36.300 V13.3.0 (Jun. 2016),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),total 295 pages.

3GPP TS 36.321 V13.1.0 (Mar. 2016),3rd Generation Partnership Project;Technical Specification Group Radio Access Network;Evolved Universal Terrestrial Radio Access (E-UTRA);Medium Access Control (MAC) protocol specification (Release 13),total 85 pages.

3GPP TS 36.211 V10.4.0 (Dec. 2011), 3rd Generation Partnership Project;Technical Specification Group Radio Access Network;Evolved Universal Terrestrial Radio Access (E-UTRA);Physical Channels and Modulation(Release 10),total 101 pages.

3GPP TS 36.213 V10.4.0 (Dec. 2011),3rd Generation Partnership Project;Technical Specification Group Radio Access Network;Evolved Universal Terrestrial Radio Access (E-UTRA);Physical layer procedures(Release 10),total 125 pages.

Stefania Sesia et al.,"LTE—The UMTS. Long Term Evolution. From Theory to Practice. Second Edition", A John Wiley and Sons, Ltd., Publication,dated 2011,total 794 pages.

Erik Dahlman et al.,"4G-LTE/LTE-Advanced for Mobile Broadband",Elsevier,dated 2011,total 447 pages.

RAN WG4, Text proposal for Revision of report itu-r m.2039-2 "Characteristics of terrestrial IMT-2000 systems for frequency sharing/interference analyses". 3GPP TSG RAN WG4 Meeting #69, San Francisco, USA, Nov. 11 15, 2013, R4-137080, 66 pages.

\* cited by examiner

DATA PROCESSING METHOD, APPARATUS, AND SYSTEM

CROSS-REFERENCE TO RELATED APPLICATIONS

This application is a continuation of International Application No. PCT/CN2017/077506, filed on Mar. 21, 2017, which claims priority to Chinese Application No. 201610341603.7, filed on May 20, 2016, The disclosures of the aforementioned applications are hereby incorporated by reference in their entireties.

TECHNICAL FIELD

The present application relates to the field of mobile communications networks, and in particular, to a data processing method, an apparatus, and a system.

BACKGROUND

In a typical wireless network such as a Long Term Evolution (LTE) network, an uplink (UL) shared data channel is selected based on scheduling/grant, and a scheduling/grant mechanism is controlled by a base station (BS) in the network. User equipment (UE) sends a UL scheduling request to the base station. When the BS receives the scheduling request, the BS sends, to the UE, a UL grant indicating UL resource allocation of the UE. Then the UE sends data on a granted resource.

A problem of this method is that signaling resource overheads of the scheduling/grant mechanism are quite large, especially when a transmitted data packet is relatively small. For example, for small-packet transmission including about 20 bytes each time, a resource used by the scheduling/grant mechanism may be about 30%, or even 50%, of a packet size. Another problem of this method is that a scheduling/grant process causes an initial delay, namely, an access delay, of data processing. In the typical wireless network, even if a resource is available, there is still a minimum delay of 7 ms to 8 ms between a time when a scheduling request is sent and a time when first uplink data processing is performed.

In recent years, an uplink scheduling/grant free (Grant Free) transmission solution has been proposed in the art, to resolve problems caused by mass user access, such as signaling overheads and an access delay. Grant free means that user equipment can access a network at any time to process uplink data, without a need of scheduling/grant on a base station side. This solution avoids an access delay and greatly reduces signaling overheads.

In a grant free transmission system, because the base station side performs no scheduling, user equipments independently select pilots, and pilot collision is inevitable. Once pilot collision occurs, because a user subject to the pilot collision cannot be detected, a signal of the user causes strong interference to another user who uses a same resource, thereby reducing a rate of successfully decoding user data by the base station side.

SUMMARY

Embodiments of the present application provide a data processing method, a system, and a device, to resolve the foregoing technical problem that a rate of successfully decoding user data by a base station side is reduced due to pilot collision. The technical solutions are as follows:

According to a first aspect, an embodiment of the present application provides a data processing method. The method includes: determining a pilot group, where the pilot group includes at least two elements, the first element is used to indicate a first pilot sent by UE in a first unit time, and the second element is used to indicate a second pilot sent by the UE in a second unit time; generating a plurality of data frames including a first data frame and a second data frame, where each data frame carries information used to indicate the pilot group; and sending a plurality of resource blocks to a network device, where a first resource block carries the first pilot and the first data frame, and a second resource block carries the second pilot and the second data frame.

According to another aspect, an embodiment of the present application further provides a data processing method. The method includes: receiving a plurality of resource blocks from a plurality of user equipments UEs, where each resource block carries a pilot and a data frame of one or more of the UEs, and each data frame carries information used to indicate a pilot group of one UE; obtaining pilot groups determined by at least some of the UEs, where each pilot group includes at least two elements, the first element is used to indicate a first pilot sent by corresponding UE in a first unit time, and the second element is used to indicate a second pilot sent by the corresponding UE in a second unit time; and decoding data frames of the plurality of UEs based on the pilot groups determined by the at least some of the UEs.

According to another aspect, an embodiment of the present application further provides user equipment (UE), including a processing unit, configured to: determine a pilot group, where the pilot group includes at least two elements, the first element is used to indicate a first pilot sent by the UE in a first unit time, and the second element is used to indicate a second pilot sent by the UE in a second unit time; and generate a plurality of data frames, where each data frame carries information used to indicate the pilot group; and a sending unit, configured to send a plurality of resource blocks to a network device, where a first resource block carries the first pilot and a first data frame, and a second resource block carries the second pilot and a second data frame.

According to another aspect, an embodiment of the present application further provides a network device, including a receiving unit, configured to: receive a plurality of resource blocks from a plurality of user equipments UEs, where each resource block carries a pilot and a data frame of one or more of the UEs, and each data frame carries information used to indicate a pilot group of one UE; and a processing unit, configured to: obtain pilot groups determined by at least some of the UEs, where the pilot group includes at least two elements, the first element is used to indicate a first pilot sent by the UE in a first unit time, and the second element is used to indicate a second pilot sent by the UE in a second unit time; and decode data frames of the plurality of UEs based on the pilot groups determined by the at least some of the UEs.

According to another aspect, an embodiment of the present application provides a network element, including a memory, configured to store computer-executable program code; a transceiver; and a processor, coupled with the memory and the transceiver.

The program code includes an instruction, and when the processor executes the instruction, the instruction enables the network element to perform the following operations: determining a pilot group, where the pilot group includes at least two elements, the first element is used to indicate a first pilot sent by UE in a first unit time, and the second element is used to indicate a second pilot sent by the UE in a second unit time; generating a plurality of data frames including a first data frame and a second data frame, where each data frame carries information used to indicate the pilot group; and sending a plurality of resource blocks to a network device, where a first resource block carries the first pilot and the first data frame, and a second resource block carries the second pilot and the second data frame.

According to another aspect, an embodiment of the present application provides a network element, including a memory, configured to store computer-executable program code; a transceiver; and a processor, coupled with the memory and the transceiver.

The program code includes an instruction, and when the processor executes the instruction, the instruction enables the network element to perform the following operations: receiving a plurality of resource blocks from a plurality of user equipments UEs, where each resource block carries a pilot and a data frame of one or more of the UEs, and each data frame carries information used to indicate a pilot group of one UE; obtaining pilot groups determined by at least some of the UEs, where each pilot group includes at least two elements, the first element is used to indicate a first pilot sent by corresponding UE in a first unit time, and the second element is used to indicate a second pilot sent by the corresponding UE in a second unit time; and decoding data frames of the plurality of UEs based on the pilot groups determined by the at least some of the UEs.

According to another aspect, an embodiment of the present application provides a computer storage medium, configured to store a computer software instruction used by user equipment. The computer software instruction includes a program designed to perform the foregoing aspects.

According to another aspect, an embodiment of the present application provides a computer storage medium, configured to store a computer software instruction used by the foregoing network device. The computer software instruction includes a program designed to perform the foregoing aspects.

According to another aspect, an embodiment of the present application further provides a network communications system, including user equipment UE and a network device. The network device is connected to one or more UEs using a wireless network, and the UE is the UE in any one of the second aspect or the possible designs of the second aspect of the embodiments of the present application.

A beneficial effect of the technical solutions provided in the embodiments of the present application is: The network device obtains pilot groups of at least some UEs, further obtains pilot groups of all UEs, further obtains channel estimation information of the UEs, and further decodes data transmitted by the UEs in unit time, thereby effectively resolving a technical problem that decoding cannot be performed due to collision of some pilots.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings without creative efforts.

DESCRIPTION OF EMBODIMENTS

Figure 1:
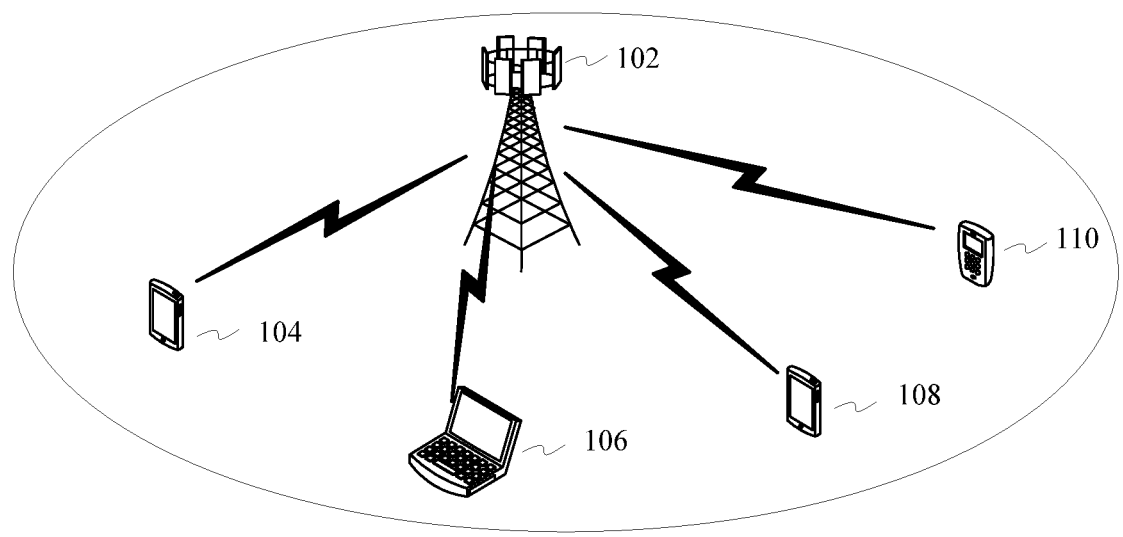
FIG. 1 is a schematic diagram of a system architecture of a radio access network according to an embodiment of the present application.

To make the application objectives, features, and advantages of the present application clearer and more comprehensible, the following clearly describes the technical solutions in the embodiments of the present application with reference to the accompanying drawings in the embodiments of the present application. Apparently, the embodiments described in the following are merely some but not all of the embodiments of the present application. All other embodiments obtained by a person skilled in the art based on the embodiments of the present application shall fall within the protection scope of the present application.

In the specification, claims, and accompanying drawings of the present application, the terms "first", "second", and so on are intended to distinguish between similar objects but do not necessarily indicate a specific order or sequence. It should be understood that the terms used in such a way are interchangeable in proper circumstances, and this is merely a discrimination manner that is used when objects having a same attribute are described in the embodiments of the present application. In addition, the terms "including", "having", and any other variants mean to cover the non-exclusive inclusion, so that a process, method, system, product, or device that includes a series of units is not necessarily limited to those units, but may include other units not expressly listed or inherent to such a process, method, system, product, or device.

The technical solutions in the embodiments of the present application may be applied to various communications systems, such as a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short) system, a Long Term Evolution ("LTE" for short) system, an LTE frequency division duplex ("FDD" for short) system, an LTE time division duplex ("TDD" for short) system, a Universal Mobile Telecommunications System ("UMTS" for short), a Worldwide Interoperability for Microwave Access ("WiMAX" for short) communications system, and a future 5G communications system.

In the present application, user equipment may communicate with one or more core networks using a radio access network (RAN). The user equipment may be an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol ("SIP" for short) phone, a wireless local loop ("WLL" for short) station, a personal digital assistant ("PDA" for short), a handheld device having a wireless communication function, a computing device, another processing device connected to a wireless modem, an in-vehicle device, a wearable device, UE in a future 5G network, or the like.

In the present application, a network device may be a network-side device configured to communicate with user equipment. For example, the network device may be a base transceiver station ("BTS" for short) in a GSM system or a CDMA system, may be a NodeB ("NB" for short) in a WCDMA system, or may be an evolved NodeB ("eNB" or "eNodeB" for short) in an LTE system. Alternatively, the network device may be a relay station, an access point, an in-vehicle device, a wearable device, a network-side device in a future 5G network, a network-side device in a future evolved PLMN network, or the like.

FIG. 1 is a schematic architectural diagram of a communications network 100 according to an embodiment of the present application. A network device 102 manages uplink communication and downlink communication of UEs 104 to 110 in a coverage area of the network device 102 (in FIG. 1, an example in which a mobile phone and a notebook computer are UEs is used, and the UEs in FIG. 1 may alternatively be the foregoing other terminal devices). The network device 102 may alternatively be referred to as a cellular tower, an eNodeB, an access network, a base station BS, or the like. The network device 102 can simultaneously support transmission on a plurality of cellular carriers. The network device 102 implements a grant free transmission solution, so that the UEs 104 to 110 may contend for and access an uplink resource without a need of a request/grant mechanism.

According to this solution, the UEs 104 to 110 may initiate uplink transmission without a need of requesting the network device 102 for resource allocation. Therefore, grant free saves total network overhead resources. In addition, the system allows a bypass request/grant solution to be used to save time in uplink duration. Although FIG. 1 shows only one network device 102 and six UEs 104 to 110, a typical network may include a plurality of network devices, and each network device covers transmission of a different quantity of mass UEs from a geographic coverage area of the network device. In the network 100, various signaling mechanisms are used to enable and configure grant free transmission. The UEs 104 to 110 that can perform grant free transmission notify the network device 102 of this capability using signaling, so that the network device 102 can support both grant free transmission and conventional signal/grant transmission (for example, for an earlier UE model). The UEs may notify the network device 102 of this capability using radio resource control (RRC) signaling defined in a 3rd Generation Partnership Project (3GPP) standard. For example, a new field may be added to a UE capability list in the RRC signaling, to indicate whether the UEs support grant free transmission. Alternatively, one or more existing fields may be modified, or deduction may be performed based on one or more existing fields, to indicate grant free support.

The network device 102, according to one embodiment, further uses an advanced mechanism (for example, a broadcast channel or a slow signaling channel) to notify the UEs 104 to 110 of information required for enabling and configuring the grant free transmission solution. For example, the network device 102 may notify the UEs using master information block (MIB) or system information block (SIB) signaling. For example, a related parameter may be added to the SIB signaling to indicate some specific mandatory information.

Figure 2:
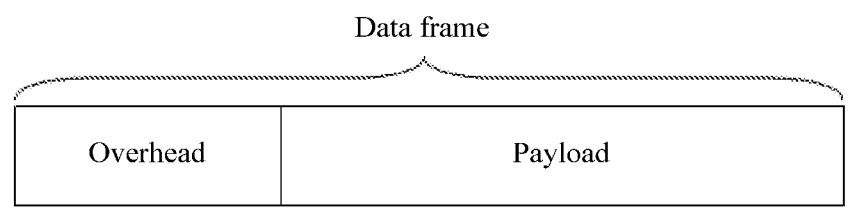
FIG. 2 is a schematic structural diagram of an uplink frame according to an embodiment of the present application.

FIG. 2 is a schematic structural diagram of a data frame in grant free uplink transmission according to an embodiment of the present application. The data frame in uplink transmission includes an overhead (may also be referred to as a frame header) and a payload. It should be noted that the data frame mentioned in this patent application includes both control information and data, for example, user-related data.

Figure 3:
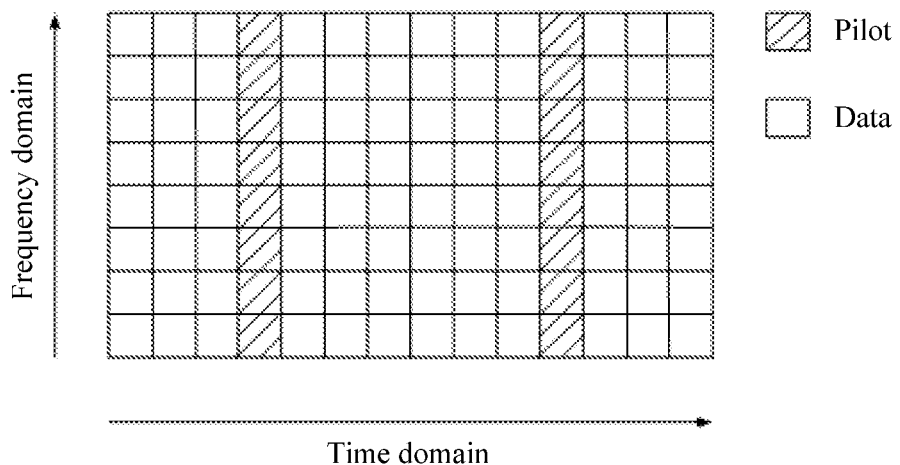
FIG. 3 is a schematic diagram of a resource block according to an embodiment of the present application.

FIG. 3 is a schematic diagram of mapping a data frame onto a resource block according to an embodiment of the present application. The resource block in this embodiment of the present application is a resource that is used to carry a pilot and/or a data and the resource is determined based on a requirement of a specific communications protocol. For example, the specific communications protocol may be 3rd Generation Partnership Project (3GPP). For example, the resource block may be a standard-specified physical resource block (PRB), a resource element (RE), a group of REs, or an orthogonal frequency division multiplexing (OFDM) symbol. For example, under requirements of different communications protocols, the resource block in this embodiment of the present application may alternatively indicate a time, frequency-domain, or code-domain resource for another unit. This is not limited herein. The resource block includes two domains: a pilot domain and a data domain. A data frame is usually mapped onto the data domain in the resource block, and a pilot is usually used for channel estimation, user detection, data demodulation, and the like.

It should be understood that UE determines a transmission resource of the UE based on known predefined mapping rules of UE (for example, the UEs 104 to 110) and the network device 102 in a network (for example, the network 100). These mapping rules may be implicit (for example, default) rules predefined for the UE (for example, in an applicable standard or in firmware of the UE), and/or explicit rules defined by the network device using advanced signaling. For example, different mapping rules (referred to as mapping configurations) are predefined in a wireless standard such as 3GPP, and a network device notifies UE of an index of an available mapping configuration using signaling.

In addition, for explanations of some specific nouns and terms in the embodiments of the present application, refer to definitions in a 3GPP wireless standard. For example, the term pilot refers to: For a user equipment to successfully receive a network service (such as network camping and data transmission), the user equipment needs to perform a series of measurements and feedbacks on a network, such as a carrier channel quality measurement (a measurement performed for data reception, such as a carrier signal strength and signal quality measurement), channel estimation, and a channel state information (CSI) measurement and feedback. Physical signals based on which the user equipment performs the series of measurements and feedbacks may be collectively referred to as pilot signals. In the embodiments of the present application, the term pilot may also be referred to as a pilot signal. For convenience, the term pilot is used as a collective term in the present application.

In addition, it should be further understood that a unit time described in the embodiments of the present application may be a time resource that is used to send or receive a signal and that is determined based on a requirement of a specific communications protocol. One unit time may be one subframe, one transmission time interval (TTI), or one or more timeslots. For different communications protocols, the unit time described in the embodiments of the present application may alternatively indicate a time resource in another unit. This is not limited herein.

It should be further understood that pilot collision means that a plurality of UEs (at least two UEs) simultaneously access a same frequency, time, or code-domain resource using one pilot sequence. In an uplink grant free transmission solution, a pilot collision may cause an irreparable result. The reason is that when a pilot collision occurs, the network device 102 cannot decode information transmitted by the UEs, because the network device 102 cannot distinguish between the UEs using a same pilot, and therefore cannot estimate channels of the UEs. For example, assuming that two UEs (UE 104 and UE 106) have a same pilot and channel quality of the UEs is h1 and h2 respectively, the network device 102 first detects the UEs as one UE (the UEs are considered as one UE), and quality of a channel obtained by estimation is a channel quality sum h1+h2 of the UE 104 and the UE 106. Therefore, transmitted information is not to be correctly decoded.

When pilot collision occurs, a network device cannot decode information transmitted by UE. A method provided in the embodiments of the present application can resolve this technical problem.

Embodiment 1

Figure 4:
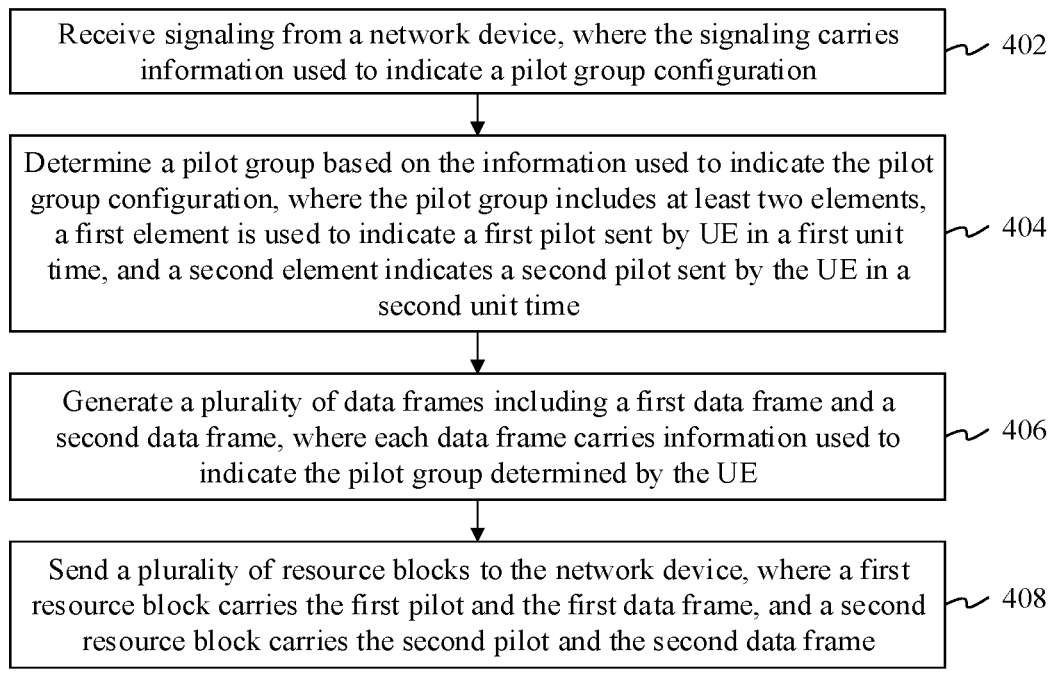
FIG. 4 is a schematic flowchart of a data processing method according to an embodiment of the present application.

As shown in FIG. 4, Embodiment 1 of the present application provides a data processing method, which is as follows:

Operation 402. Receive signaling from a network device, where the signaling carries information used to indicate a pilot group configuration.

Operation 404. Determine a pilot group based on the information used to indicate the pilot group configuration, where the pilot group includes at least two elements, a first element is used to indicate a first pilot transmitted by UE in a first unit time, and a second element indicates a second pilot transmitted by the UE in a second unit time.

Operation 406. Generate a plurality of data frames including a first data frame and a second data frame, where each data frame carries information used to indicate the pilot group determined by the UE.

Operation 408. Send a plurality of resource blocks to the network device, where a first resource block carries the first pilot and the first data frame, and a second resource block carries the second pilot and the second data frame.

Specifically, the element may be a pilot number or a pilot identifier, or may be one or more specific parameters used to identify a pilot. For example, the pilot group may be expressed as {P1, P2, ..., PN}, where N is an integer greater than 2, and PN is a pilot group element.

Optionally, in an implementation, the signaling from the network device is master information block (MIB) or system information block (SIB) signaling, or signaling in another format.

For example, a SIB signaling format is shown as follows. A Pilot~GroupIndex field is added to Pilot~ConfigInfo of a SIB, to indicate the information of the pilot group configuration.

```
SystemInformationBlockType ::= SEQUENCE {
    ......
    RadioResourceConfigCommonSIB,
    ......
}
RadioResourceConfigCommonSIB ::= SEQUENCE {
    ......
    Pilot~ConfigCommon,
    Pilot~ConfigSIB,
    ......
}
Pilot~ConfigSIB ::= SEQUENCE {
    ......
    Pilot~ConfigInfo
    ......
}
Pilot~ConfigInfo ::= SEQUENCE {
    ......
    pilot~GroupIndex
    ......
}
```

Further, the signaling in operation 402 carries the information used to indicate the pilot group configuration. The information used to indicate the pilot group configuration may be a table number. An implementation solution is as follows:

The information of the pilot group configuration is pre-stored on the network device and UEs in a form of one or more tables. Each table includes at least two pieces of information: a pilot group number and a pilot group, for example, as shown in Table 1 or Table 2. The table number needs to be broadcast to the UEs using the signaling. The UEs select respective pilot groups from corresponding tables based on a preconfigured algorithm. An advantage of this manner is that only a relatively small quantity of information bits are required to identify the information of the pilot group configuration, thereby reducing signaling overheads.

TABLE 1

| Pilot group number | Pilot group |
|---|---|
| 1 | {1, 1} |
| 2 | {2, 1} |
| 3 | {3, 2} |
| 4 | {4, 1} |

TABLE 2

| Pilot group number | Pilot group |
| --- | --- |
| 1 | {1, 1, 1} |
| 2 | {2, 1, 3} |
| 3 | {2, 3, 1} |
| 4 | {3, 1, 1} |

It should be noted that sizes and content of the foregoing plurality of tables may be different. The network device may select different tables based on the preconfigured algorithm and different network load or different quantities of UEs. For example, in a scenario, the network device selects Table 1 as the information of the pilot group configuration and broadcasts Table 1 to the UEs. In this case, the signaling needs to carry only information used to indicate Table 1, for example, a table number 1. After receiving the signaling, the UE learns that the UE should select a proper pilot group from Table 1 as the pilot group of the UE.

Specifically, the UE may select the pilot group of the UE from Table 1 based on the preconfigured algorithm. The preconfigured algorithm has a plurality of implementations. This embodiment of the present application provides three implementations.

For example, an implementation is: The preconfigured algorithm may be a random algorithm. For example, the pilot group {2, 1} whose pilot group number is 2 in Table 1 is randomly selected. It should be understood that the UE should report the pilot group number to the network device when the UE obtains the pilot group using the random algorithm. To be specific, in this implementation, the data frame carries the pilot group number 2.

For another example, another implementation is: The preconfigured algorithm used by the UE is dividing a user equipment identifier (UE identifier, UEid) by a quantity K of pilot groups and then performing a modulo operation, and is expressed as UEid (MOD) K. For example, in Table 1, K is equal to 4, and a pilot group selected by UE whose ID is 9 is the pilot group {1, 1} whose number is 1. It should be understood that the UE needs to report only the identifier ID of the UE to the network device when the UE obtains the pilot group by performing a modulo operation on the identifier ID of the UE and the quantity of pilot groups. After receiving the ID of the UE, the network device may obtain the pilot group number by performing a modulo operation on the ID of the UE and K. In this implementation, the data frame may carry the ID of the UE, and may further carry the pilot group number.

For another example, another implementation is: The preconfigured algorithm is performing a modulo operation on a quantity K of pilot groups and a sum of an identifier ID of the UE and a system frame number (SFN), and is expressed as (UEid+SFN) MOD K. For example, in Table 1, K is equal to 4, and a pilot group selected by UE whose ID is 9 and whose SFN is 1 is the pilot group {2, 1} whose number is 2. It should be understood that the UE needs to report only the ID of the UE when the UE obtains the pilot group by performing a modulo operation on the quantity K of pilot groups and the sum of the identifier ID of the UE and the frame number SFN. After receiving the ID of the UE, the network device then obtains the SFN, and then can obtain the pilot group of the UE. In this implementation, the data frame carries the ID of the UE, and may further carry the pilot group number.

It should be understood that the ID of the UE is allocated to the UE by the network device and is used to uniquely identify the UE. For example, when the UE performs random access, a base station allocates an ID to the UE to identify the UE. Alternatively, in other processes such as Attach, Detach, TAU, and ServiceRequest processes, the network device allocates a unique identifier to the UE. For other detailed information about the ID of the UE, refer to descriptions in the prior art. Details are not described herein.

It should be further understood that the SFN is information read from a primary common control physical channel when the UE performs cell synchronization, and is temporarily stored on the UE. Usually, the SFN includes a total of 10 bits, and has a value ranging from 0 to 1023. For other detailed information about the SFN, refer to descriptions in the prior art. Details are not described herein.

In one embodiment, the method 400 further includes the following operation:

Operation A. Obtain a pilot based on the pilot group.

Specifically, there may be a plurality of implementations of obtaining the pilot. An implementation is: The UE preconfigures a table of a mapping relationship between a pilot number and a pilot, as shown in Table 3 below:

TABLE 3

| Pilot mapping table | |
| --- | --- |
| Pilot number | Specific pilot signal |
| 1 | A |
| 2 | B |
| 3 | C |
| ... | ... |

In this implementation, when the pilot group is expressed as {2, 1}, it can be learned based on Table 3 that the first pilot is B and the second pilot is A.

Another implementation is: The UE generates a specific pilot sequence based on a preconfigured pilot generation algorithm. For example, the pilot generation algorithm is expressed as P=Function (u), where P identifies a pilot, Function identifies a predefined algorithm, and u identifies one or more parameters. For example, Function may be a ZC sequence (Zadoff-Chu sequence) generation algorithm specified in an existing 3GPP standard. In this implementation, when the pilot group is expressed as {2, 1}, the first pilot and the second pilot can be learned based on the predefined algorithm.

Figure 5:
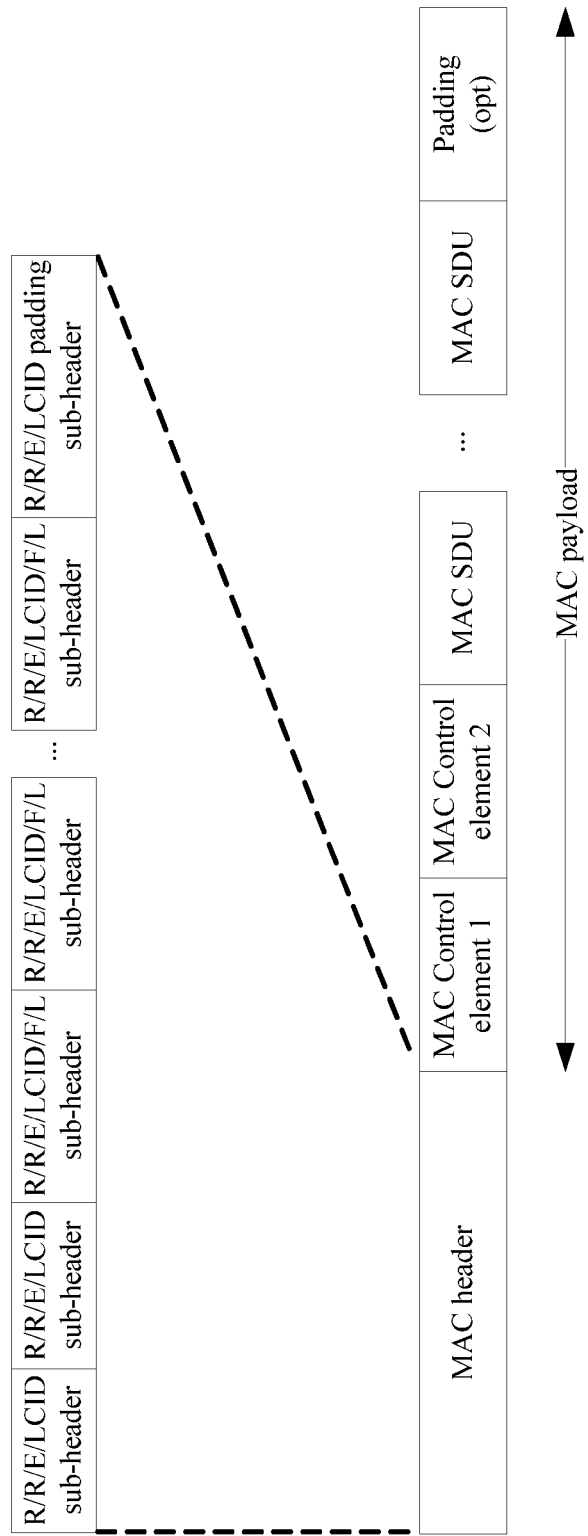
FIG. 5 is a schematic structural diagram of a frame in which a pilot group is encapsulated according to an embodiment of the present application.

Optionally, the data frame generated in operation 406 may be a user-defined frame, or may be a Media Access Control (MAC) entity frame. A format of the MAC entity frame may be shown in FIG. 5. For detailed descriptions of the MAC entity frame, refer to descriptions in section 6.1.3 in the 3GPP standard TS36.321. Details are not described herein.

Further, when the data frame is a frame in a user-defined format, the information used to indicate the pilot group may be encapsulated in a payload field of the data frame.

Further, when the data frame is the MAC entity frame, the information used to indicate the pilot group may be encapsulated in a MAC control element field of the MAC entity frame.

In Embodiment 1 of the present application, the information of the pilot group is reported to the network device, so that the network device obtains pilot groups of at least some UEs, further obtains channel estimation of the UEs, and further decodes data transmitted by the UEs in unit time, thereby effectively resolving a technical problem that decoding cannot be performed due to collision of some pilots.

Embodiment 2

Figure 6:
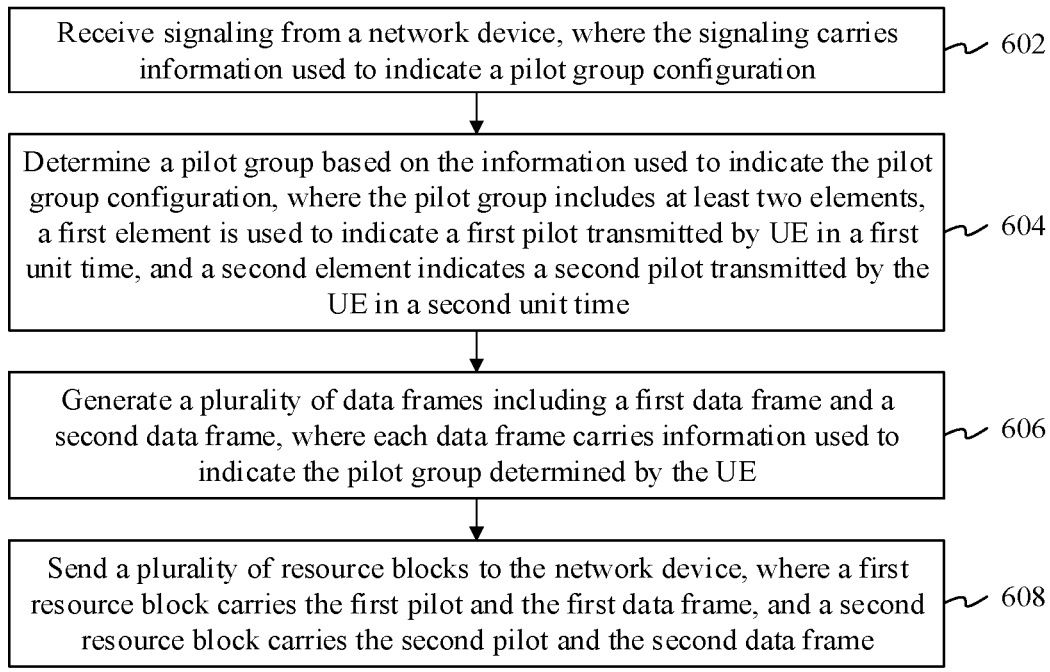
FIG. 6 is a schematic flowchart of a data processing method according to another embodiment of the present application.

As shown in FIG. 6, Embodiment 2 of the present application provides a data processing method, including the following operations:

Operation 602. Receive signaling from a network device, where the signaling carries information used to indicate a pilot group configuration.

Operation 604. Determine a pilot group based on the information of the pilot group configuration, where the pilot group includes at least two elements, a first element is used to indicate a first pilot transmitted by UE in a first unit time, and a second element indicates a second pilot transmitted by the UE in a second unit time.

Operation 606. Generate a plurality of data frames including a first data frame and a second data frame, where each data frame carries information used to indicate the pilot group determined by the UE.

Operation 608. Send a plurality of resource blocks to the network device, where a first resource block carries the first pilot and the first data frame, and a second resource block carries the second pilot and the second data frame.

Optionally, in an implementation, the signaling from the network device is an MIB or SIB message, or a message in another format.

For example, a SIB message format is shown as follows. A Pilot~GroupIndex field may be added to Pilot~ConfigInfo of a SIB, to indicate the information of the pilot group configuration.

```
SystemInformationBlockType ::= SEQUENCE {
......
RadioResourceConfigCommonSIB,
......
}
RadioResourceConfigCommonSIB ::= SEQUENCE {
......
Pilot~ConfigCommon,
Pilot~ConfigSIB,
......
}
Pilot~ConfigSIB ::= SEQUENCE {
......
Pilot~ConfigInfo
......
}
Pilot~ConfigInfo ::= SEQUENCE {
......
pilot~GroupIndex
......
}
```

Specifically, the element may be a pilot number, or may be one or more specific parameters used to identify a pilot. For example, the pilot group is expressed as {P1, P2, . . . , PN}, where PN is a pilot group element.

Specifically, in one embodiment, the signaling in operation 602 carries the information used to indicate the pilot group configuration. An implementation is as follows:

The information of the pilot group configuration is prestored on the network device and the UE in a form of a table. The table includes at least two pieces of content: a number of a pilot group configuration mode and a quantity of pilot group elements. Optionally, the table may further include a quantity of available pilot resources. For example, the form of the table may be shown in Table 4 or Table 5.

TABLE 4

| Number of a pilot group configuration mode | Quantity of pilot group elements |
|---|---|
| 1 | 2 |
| 2 | 3 |
| 3 | 4 |
| . . . | . . . |

TABLE 5

| Number of a pilot group configuration mode | Quantity of pilot group elements | Quantity of available pilot resources |
|---|---|---|
| 1 | 2 | 64 |
| 2 | 3 | 16 |
| 3 | 4 | 48 |
| . . . | . . . | . . . |

The number of a pilot group configuration mode is used to identify different pilot group configuration modes. The quantity of pilot group elements is used to identify a quantity of pilot group elements. The quantity of available pilot resources is used to identify a quantity of available pilots of a system.

It should be understood that a pilot group configuration mode may be used to indicate which type a pilot group belongs. For example, a pilot group may be categorized based on a quantity of pilots included in the pilot group. Certainly, a person skilled in the art should understand that a pilot group may alternatively be categorized based on another factor. Details are not described herein. The categorization based on the quantity of pilots included in the pilot group may be: A pilot group configuration mode is related to an application scenario or a current network status of the system. For example, the network device configures, based on the current network status (for example, a factor such as network load, a quantity of connections of the UE, or a channel status), the pilot group to include two elements; or configures, based on another network status, the pilot group to include three elements.

In one embodiment, a value of the quantity of pilot group elements is 2, 3, or 4.

In this implementation, the signaling needs to carry only the information used to indicate the pilot group configuration, for example, the number of the pilot group configuration mode. It should be noted that Table 4 includes only two columns of information, implicitly indicating that the quantity of available pilot resources is a known default configuration (for example, 64), and pilots have been preconfigured on a UE side and a network device side. For example, there are a total of 64 types of pilots in existing LTE. The 64 types of pilot resources are preconfigured on the network device side and the UE side.

For example, using an example in which Table 4 is prestored on the UE side as a pilot group configuration table, when the UE receives a pilot group whose configuration mode number is 1 and that is sent by the network device, it indicates that the quantity of pilot group elements in the current system is 2.

In this case, the UE may obtain a specific pilot group in a plurality of manners. For example, an implementation is preconfiguring Table 6 on the UE side and the network device side, where Table 6 is a table of a mapping relationship between a pilot group number and a pilot group. For example, the UE selects a pilot configuration whose configuration number is 1. This means that a subsequent pilot group has two elements, and a pilot may be selected from 64 pilot sequences in the system. First, the UE may obtain a pilot group number using the three implementations listed in Embodiment 1, for example, random selection, performing a modulo operation on an ID of the UE and a quantity K of pilot groups, or performing a modulo operation on K and a sum of an ID of the UE and an SFN. Details are not described herein again.

Then a corresponding pilot group is obtained based on Table 6. For example, after the UE learns, by performing a Mod operation on 64 and the sum of the ID of the UE and the SFN, that the pilot group number is 2, the UE may learn, based on Table 6, that the pilot group is {1, 2}.

TABLE 6

| Pilot group number | Pilot group |
|---|---|
| 1 | {1, 1} |
| 2 | {1, 2} |
| 3 | {1, 3} |
| ... | ... |
| 4096 | {64, 64} |

In one embodiment, another implementation is using a manner of prestoring a formula. For example:

The UE side and the network device side preconfigure a formula for obtaining a pilot group based on a pilot group number.

Likewise, first, the UE may obtain a pilot group number using the three implementations listed in Embodiment 1, for example, random selection, performing a modulo operation on an ID of the UE and a quantity K of pilot groups, or performing a modulo operation on K and a sum of an ID of the UE and an SFN. Details are not described herein again.

Then a pilot group is obtained based on the following algorithm.

For example, the pilot group number is expressed as GIndex; there are z pilot group elements, expressed as {SIndex(z), SIndex(z-1), ..., SIndex(1)}; and the quantity of available pilot resources is expressed as SNumber. Then formulas are:

$$SIndex(z) = \lfloor GIndex/SNumber^{z-1} \rfloor;$$

$$SIndex(z-1) = \lfloor (GIndex \bmod SNumber^{z-1})/SNumber^{z-2} \rfloor; \text{ and}$$

$$SIndex(i) = \lfloor (GIndex \bmod SNumber^i)/SNumber^{i-1} \rfloor, i=1,2\ldots z, \text{ where}$$

⌊ ⌋ indicates rounding down, and mod indicates a modulo operation.

Alternatively, formulas are expressed as (when the quantity of available pilots is a default configuration):

$$SIndex(z) = \lfloor GIndex/C^{z-1} \rfloor;$$

$$SIndex(z-1) = \lfloor (GIndex \bmod C^{z-1})/C^{z-2} \rfloor; \text{ and}$$

$$SIndex(i) = \lfloor (GIndex \bmod C^i)/C^{i-1} \rfloor, i=1,2\ldots z, \text{ where}$$

C is an integer greater than 2, and a value of C may be a constant.

For example, SNumber is 5, and a number ranges from 0 to 4. z=2, and a value of GIndex ranges from 0 to 24. When the value of GIndex is 23, it can be learned, by calculation using the foregoing formulas, that corresponding pilot group elements are {4, 3} when the pilot group number is 23.

$$SIndex(2) = \lfloor GIndex/SNumber^1 \rfloor = \lfloor 23/5 \rfloor = 4; \text{ and}$$

$$SIndex(1) = \lfloor (GIndex \bmod SNumber^1)/SNumber^0 \rfloor = \lfloor 3/5 \rfloor = 3.$$

Optionally, after the UE determines the pilot group of the UE, the UE may report the pilot group number to the network device. To be specific, the information used to identify the pilot group is the pilot group number.

Optionally, the UE may alternatively report the ID of the UE to the network device as the information used to indicate the pilot group. In this implementation, the network device deduces, based on the ID of the UE and using the foregoing prestored tables or formulas, the pilot group selected by the UE.

Optionally, the method 600 further includes the following operation:

Operation A. Obtain a pilot based on the pilot group.

Specifically, there may be a plurality of implementations of obtaining the pilot. An implementation is: The UE preconfigures a table of a mapping relationship between a pilot number and a pilot, as shown in Table 7 below:

TABLE 7

| Pilot mapping table | |
|---|---|
| Pilot number | Specific pilot signal |
| 1 | A |
| 2 | B |
| 3 | C |
| ... | ... |

Another implementation is: The UE generates a specific pilot sequence based on a PN transmitted by the network device and a preconfigured pilot algorithm. For example, a pilot generation formula is P=Function (u), where P represents a pilot, Function represents a predefined algorithm, and u represents one or more parameters.

For example, Function may be a ZC sequence (Zadoff-Chu sequence) generation algorithm specified in an existing 3GPP standard.

For descriptions of the pilot, the pilot group, the pilot group element, the unit time, and the resource block, refer to the foregoing embodiments. Details are not described herein again.

Optionally, the data frame generated in operation 606 may be a user-defined frame, or may be a Media Access Control (MAC) entity frame. A format of the MAC entity frame may be shown in FIG. 5. For a structure of the MAC entity frame, refer to descriptions in section 6.1.3 in the 3GPP standard TS36.321. Details are not described herein.

Further, when the data frame is a frame in a user-defined format, the information used to indicate the pilot group may be encapsulated in a payload field of the data frame.

Further, when the data frame is the MAC entity frame, the information used to indicate the pilot group may be encapsulated in a MAC control element field of the MAC entity frame.

In Embodiment 2 of the present application, the information of the pilot group is reported to the network device, so that the network device obtains pilot groups of at least some UEs, further obtains channel estimation of the UEs, and further decodes data transmitted by the UEs in unit time, thereby effectively resolving a technical problem that decoding cannot be performed due to collision of some pilots.

Embodiment 3

Figure 7:
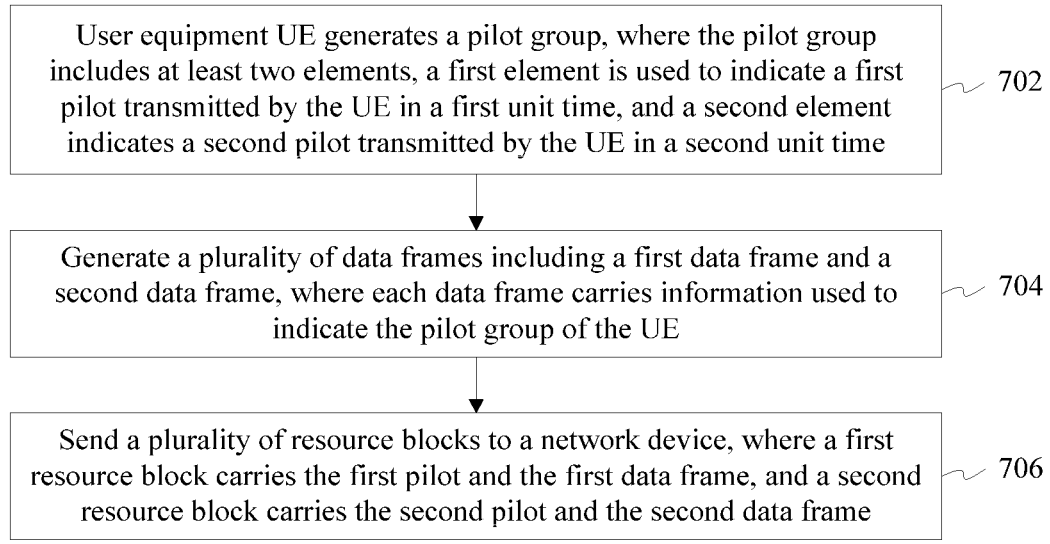
FIG. 7 is a schematic flowchart of a data processing method according to another embodiment of the present application.

As shown in FIG. 7, Embodiment 3 of the present application provides a data processing method, including the following operations:

Operation 702. UE generates a pilot group, where the pilot group includes at least two elements, a first element is used to indicate a first pilot selected by the UE in a first unit time, and a second element indicates a second pilot selected by the UE in a second unit time.

Operation 704. Generate a plurality of data frames including a first data frame and a second data frame, where each data frame carries information used to indicate the pilot group.

Operation 706. Send a plurality of resource blocks to a network device, where a first resource block carries the first pilot and the first data frame, and a second resource block carries the second pilot and the second data frame.

Optionally, in one embodiment, operations for generating the pilot group by the UE are as follows:

prestoring, by the UE, a table of a mapping relationship between a pilot number and a pilot; and generating a pilot group based on a predefined algorithm, for example, generating a pilot group {2, 3} based on a random selection algorithm.

For example, the table of a mapping relationship between a pilot number and a pilot is shown in Table 8 below:

TABLE 8

| Pilot mapping table | |
|---|---|
| Pilot number | Specific pilot signal |
| 1 | A |
| 2 | B |
| 3 | C |
| ... | ... |

Optionally, the data frame generated in operation 704 may be a MAC entity frame, or may be a user-defined frame. A format of the MAC entity frame may be shown in FIG. 5. For a structure of the MAC entity frame, refer to descriptions in section 6.1.3 in the 3GPP standard TS36.321. Details are not described herein.

It should be understood that, in this embodiment of the present application, the information used to indicate the pilot group is a pilot number.

It should be further understood that the pilot number is encapsulated in a MAC control element field of the MAC entity frame.

Optionally, the method 700 further includes the following operation:

Operation A. Obtain a pilot based on the pilot group.

Specifically, there may be a plurality of implementations of obtaining the pilot. An implementation is: The UE preconfigures a table of a mapping relationship between a pilot number and a pilot, as shown in Table 9 below:

TABLE 9

| Pilot mapping table | |
|---|---|
| Pilot number | Specific pilot signal |
| 1 | A |
| 2 | B |
| 3 | C |
| ... | ... |

Another implementation is: The UE generates a specific pilot sequence based on a PN transmitted by the network device and a preconfigured pilot algorithm. For example, a pilot generation formula is P=Function (u), where P represents a pilot, Function represents a predefined algorithm, and u represents one or more parameters.

For example, Function may be a ZC sequence (Zadoff-Chu sequence) generation algorithm specified in an existing 3GPP standard.

For descriptions of the pilot, the pilot group, the pilot group element, the unit time, and the resource block, refer to the foregoing embodiments. Details are not described herein again.

In Embodiment 3 of the present application, the information of the pilot group is reported to the network device, so that the network device obtains pilot groups of at least some UEs, further obtains channel estimation of the UEs, and further decodes data transmitted by the UEs in unit time, thereby effectively resolving a technical problem that decoding cannot be performed due to collision of some pilots.

Embodiment 4

Figure 8:
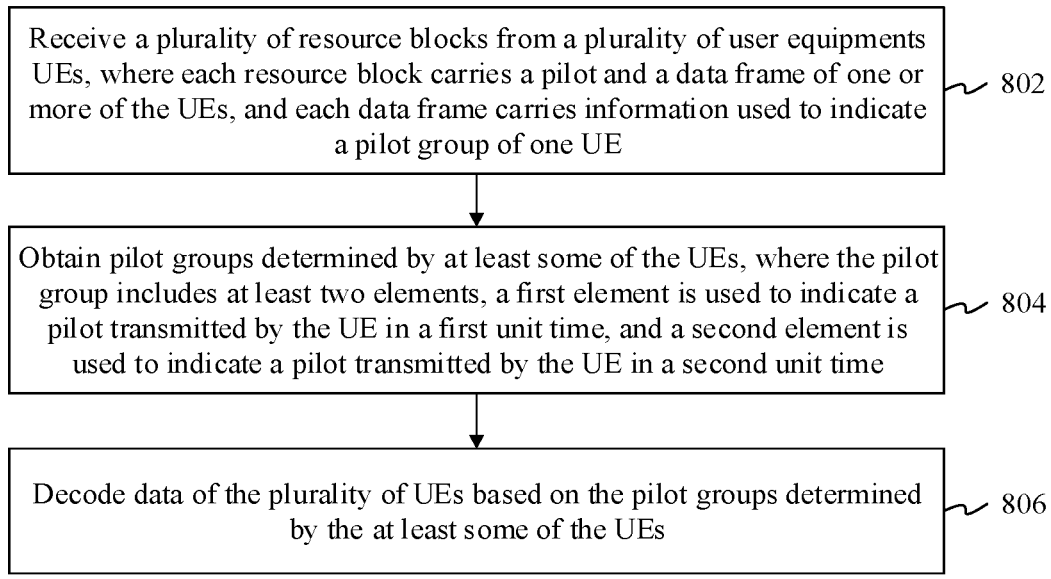
FIG. 8 is a schematic flowchart of a data processing method according to another embodiment of the present application.

As shown in FIG. 8, an embodiment of the present application further provides a data processing method. Before demodulation of data is described in detail, it should be noted that whether a receive end can obtain an accurate user detection and channel estimation result is key to data decoding. An embodiment of the present application describes the operations to obtain accurate user detection and channel estimation results based on pilot group information, and further perform decoding correctly based on the channel estimation results.

Operation 802. Receive a plurality of resource blocks from a plurality of user equipments UEs, where each resource block carries a pilot and a data frame of one or more of the UEs, and each data frame carries information used to indicate a pilot group determined by one UE.

Operation 804. Obtain pilot groups determined by at least some of the UEs, where the pilot group includes at least two elements, the first element is used to indicate a first pilot sent by the UE in a first unit time, and the second element is used to indicate a second pilot sent by the UE in a second unit time.

Operation 806. Decode data frames of the plurality of UEs based on the pilot groups determined by the at least some of the UEs.

For descriptions of the pilot, the pilot group, the pilot group element, the unit time, and the resource block, refer to the foregoing embodiments. Details are not described herein again.

In one embodiment, the method 800 further includes the following operation:

broadcasting signaling to the plurality of UEs, where the signaling carries information used to indicate a pilot group configuration.

An implementation solution is the solution described in Embodiment 1: The information of the pilot group configuration may be prestored on a network device and the UEs in a form of one or more tables. Each table includes at least two pieces of information: a pilot group number and a pilot group, for example, as shown in Table 1 or Table 2. A table number needs to be broadcast to the UEs using the signaling. The UEs select respective pilot groups from corresponding tables based on a preconfigured algorithm. It should be understood that, in this implementation solution, the information used to indicate the pilot group configuration is the table number.

A second implementation solution is the solution described in Embodiment 2: The information of the pilot group configuration is prestored on a network device and the UEs in a form of a table. The table includes at least two pieces of content: a number of a pilot group configuration mode (or referred to as a type number) and a quantity of pilot group elements.

Optionally, the table may further include a quantity of available pilot resources. For example, the form of the table may be shown in Table 4 or Table 5. It should be understood that, in this implementation solution, the information used to indicate the pilot group configuration is the number of the pilot group configuration mode.

It should be understood that a pilot group configuration mode may be used to indicate which type a pilot group belongs to. For example, a pilot group may be categorized based on a quantity of pilots included in the pilot group. Certainly, a person skilled in the art should understand that a pilot group may alternatively be categorized based on another factor. Details are not described herein. The categorization based on the quantity of pilots included in the pilot group may be: A pilot group configuration mode is related to an application scenario or a current network status of a system. For example, the network device configures, based on the current network status (for example, a factor such as network load, a quantity of connections of the UE, or a channel status), the pilot group to include two elements; or configures, based on another network status, the pilot group to include three elements.

In one embodiment, a value of the quantity of pilot group elements is 2, 3, or 4.

Specifically, the obtaining pilot groups determined by at least some of the UEs includes the following operations:

Operation A. Detect the plurality of resource blocks, and decode a resource block not subject to pilot collision, to obtain a first data frame.

Operation B. Obtain a pilot group number of first UE based on information that is used to indicate a pilot group of the first UE and that is carried in the first data frame.

Operation C. Obtain, based on the pilot group number of the first UE, the pilot group determined by the first UE.

It should be understood that, based on the descriptions in Embodiment 1 to Embodiment 3, the information used to indicate the pilot group of the first UE may be the pilot group number or an ID of the UE. When the information used to indicate the pilot group of the first UE is the ID of the UE, the pilot group may be obtained in the manner described in Embodiment 1 or Embodiment 2. The manner is as follows:

performing a modulo operation based on the ID of the UE and a quantity of pilot groups, or performing a modulo operation based on a quantity of pilot groups and a sum of the ID of the UE and a system frame number SFN, to obtain the pilot group number.

Optionally, there are three implementations of obtaining a corresponding pilot group based on a pilot group number in operation C:

A first implementation is the manner described in Embodiment 1. A pilot group may be obtained based on a prestored table of a mapping relationship between a pilot group number and a pilot group.

A second implementation and a third implementation are the manners described in Embodiment 2. A corresponding pilot group is obtained based on a prestored table or preset algorithms. For the prestored table, refer to Table 6 in Embodiment 2. Details are not described herein again. The preset algorithms are as follows:

$$SIndex(z) = \lfloor GIndex/SNumber^{z-1} \rfloor;$$

$$SIndex(z-1) = \lfloor (GIndex \bmod SNumber^{z-1})/SNumber^{z-2} \rfloor; \text{ and}$$

$$SIndex(i) = \lfloor (GIndex \bmod SNumber^i)/SNumber^{i-1} \rfloor,$$
$$i = 1, 2 \ldots z, \text{ where}$$

GIndex is the pilot group number, z is the quantity of pilot group elements, SNumber is the quantity of available pilot resources, SIndex(i) is a pilot group element, and {SIndex(z), SIndex(z-1), SIndex(i) . . . , SIndex(1)} is the pilot group.

It should be noted that after receiving the plurality of resource blocks, the network device starts to detect the plurality of resource blocks and attempts to perform decoding. Usually, only data corresponding to a pilot not subject to collision can be successfully decoded, because the network device cannot estimate channels of the UEs using a same pilot.

Specifically, the decoding data frames of the plurality of UEs based on the pilot groups of the at least some of the UEs includes the following operations:

Operation S1. Obtain, based on the pilot group of the first UE, pilots transmitted by the first UE in unit time.

Operation S2. Multiplex a pilot, of the first UE, whose data is correctly decoded to a pilot subject to collision. The multiplexing includes determining the pilot subject to collision and channel quality.

Operation S3. Perform pilot interference cancellation on the pilot subject to collision, to eliminate the multiplexed pilot signal.

Operation S4. Detect a pilot obtained after the interference cancellation, and estimate channel quality.

Operation S5. Decode data corresponding to the pilot subject to collision.

For example, for ease of understanding of operations S1 to S5, an example is used for description. For example, there are currently six UEs in a coverage area of a network device S: UE1 to UE6. When uplink grant free transmission is performed on the UEs, pilots respectively selected by the UEs are shown in Table 10:

TABLE 10

| User equipment | Pilot sent in a first unit time | Pilot sent in a second unit time |
|---|---|---|
| UE1 | A | A |
| UE2 | A | B |
| UE3 | B | B |
| UE4 | C | C |
| UE5 | C | D |
| UE6 | D | D |

Both the UE1 and the UE2 send the pilot A in the first unit time. Both the UE4 and the UE5 send the pilot C in the first unit time. Both the UE2 and the UE3 send the pilot B in the second unit time. Both the UE5 and the UE6 send the pilot D in the second unit time.

A table of a mapping between a pilot element and a pilot is prestored on both the UEs and the network device. A pilot number is used as an example, as shown in Table 11:

TABLE 11

| Pilot number | Pilot |
| --- | --- |
| 1 | A |
| 2 | B |
| 3 | C |
| 4 | D |

The UE1 to the UE6 respectively send the following pilot group information to the network device: {1, 1}, {1, 2}, {2, 2}, {3, 3}, {3, 4}, and {4, 4}.

Usually, the network device performs user detection and channel estimation on an uplink signal based on a pilot, and further decodes overlaid data information of a plurality of users. Accurate user detection and channel estimation are prerequisites of correct decoding. Using sparse code multiple access (Sparse code multiple access, SCMA) as an example, if pilots of the UEs do not collide with each other and channel estimation is accurate, a BS can reliably decode data whose overload factor is 500% (for example, data of 20 UEs is overlaid on four subcarriers). However, once pilot collision occurs, the network device cannot detect which users are subject to the pilot collision. For example, refer to Table 12 below:

TABLE 12

| First unit time | | Second unit time | |
| --- | --- | --- | --- |
| Pilot | Decoding result | Pilot | Decoding result |
| A | Decoding failed | A | Successful, UE1 |
| B | Successful, UE3 | B | Decoding failed |
| C | Decoding failed | C | Successful, UE4 |
| D | Successful, UE6 | D | Decoding failed |

As shown in Table 12, in the first unit time, because both the UE1 and the UE2 send pilot A, pilot A is subject to collision, and the network device cannot perform decoding. Only UE3 sends pilot B in the first unit time, and thus pilot B is not subject to collision. Therefore, the network device can successfully decode data of the UE3 using an existing decoding technology (such as SCMA). Similarly, in the first unit time, pilot C is also subject to collision, and decoding fails; while pilot D is not subject to collision, and decoding succeeds.

In an implementation, the network device may learn about data sent by UE1, UE3, UE4, and UE6, and may further learn that pilot groups of the UE1, the UE3, the UE4, and the UE6 that are encapsulated in the data are respectively {1, 1}, {2, 2}, {3, 3}, and {4, 4}.

In another implementation, the network device may obtain data sent by the UE1, the UE3, the UE4, and the UE6, and further learns about ID information of the UEs, and implicitly learns that pilot groups of the UE1, the UE3, the UE4, and the UE6 are respectively {1, 1}, {2, 2}, {3, 3}, and {4, 4}.

Based on the obtained pilot group information, the network device may further learn that the pilot sent by the UE1 in the first unit time is A, the pilot sent by the UE3 in the second unit time is B, the pilot sent by the UE4 in the first unit time is C, and the pilot sent by the UE6 in the second unit time is D.

One user equipment experiences basically the same channel quality in the first unit time and the second unit time. Therefore, pilots of all UEs can be obtained through pilot multiplexing and pilot successive interference cancellation (SIC), and data of the UEs is further decoded. Pilot multiplexing refers to replacing a channel of a pilot subject to collision in another unit time with an estimated channel of a pilot that is of each user equipment and that is not subject to collision. The pilot successive interference cancellation refers to, for interference among a plurality of users, a receive end partially or fully cancels interference in received pilot signals, and performs user detection and channel estimation on remaining pilot signals again. A pilot multiplexing process is shown in Table 13 below:

TABLE 13

| First unit time | | Second unit time | |
| --- | --- | --- | --- |
| Detection result | Decoding result | Detection result | Decoding result |
| A | A channel of the UE1 in the second unit time is multiplexed, and a channel of the UE1 is obtained | A | UE1 |
| B | UE3 | B | A channel of the UE3 in the first unit time is multiplexed, and a channel of the UE3 is obtained |
| C | A channel of the UE4 in the second unit time is multiplexed, and a channel of the UE4 is obtained | C | UE4 |
| D | UE6 | D | A channel of the UE6 in the first unit time is multiplexed, and a channel of the UE6 is obtained |

A pilot SIC process is shown in Table 14 below:

TABLE 14

| First unit time | | Second unit time | |
|---|---|---|---|
| Detection result | Decoding result | Detection result | Decoding result |
| A | Interference from the UE1 is canceled, and a channel of the UE2 is obtained | A | UE1 |
| B | UE3 | B | Interference from the UE3 is canceled, and a channel of the UE2 is obtained |
| C | Interference from the UE4 is canceled, and a channel of the UE5 is obtained | C | UE4 |
| D | UE6 | D | Interference from the UE6 is canceled, and a channel of the UE5 is obtained |

Using the foregoing manners, pilots of the UEs in unit time and corresponding channels are obtained, and data of the UEs is further decoded.

It should be understood that which decoding solution is used and how to perform decoding are not keys to the present application. In a possible implementation, SCMA may be used. Certainly, another access technology specified in the prior art may also be used, for example, low density spreading multiple access (LDS-MA), non orthogonal multiple access (NOMA), pattern division multiple access (PDMA), multi user shared access (MUSA), resource spread multiple access (RSMA), or non orthogonal coded multiple access (NCMA). In the decoding technologies listed above, channel estimation and user detection need to be used as decoding inputs, so as to perform decoding correctly.

It should be noted that, for ways to perform pilot successive interference cancellation, reference may be made to the prior art. Details are not described herein.

It should be understood that the technical solution provided in this embodiment of the present application can resolve a case in which at least some pilots are not subject to collision. The technical solution provided in this embodiment of the present application is not applicable to a case in which all pilots are subject to collision.

In this embodiment of the present application, the network device obtains pilot groups of at least some user equipments, further obtains pilots of all UEs, and further decodes data sent by the user equipments in unit time, thereby resolving a technical problem that decoding cannot be performed due to collision of some pilots in a grant free solution.

Embodiment 5

Figure 9:
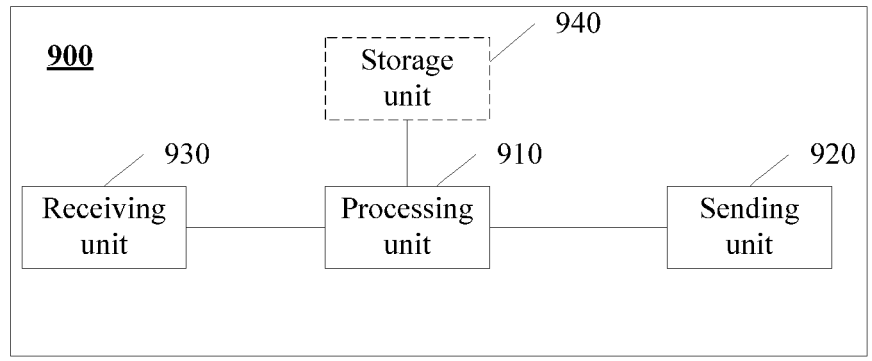
FIG. 9 is a schematic structural diagram of user equipment UE according to an embodiment of the present application.

FIG. 9 is a simplified function block diagram of user equipment UE according to another embodiment of the present application. The user equipment 900 includes a processing unit 910, a sending unit 920, and a receiving unit 930.

The receiving unit 930 is configured to receive signaling from a network device, where the signaling carries information used to indicate a pilot group configuration.

The processing unit 910 is configured to determine a pilot group based on the information used to indicate the pilot group configuration, where the pilot group includes at least two elements, the first element is used to indicate a first pilot sent by the UE in a first unit time, and the second element is used to indicate a second pilot sent by the UE in a second unit time.

The processing unit 910 is further configured to generate a plurality of data frames including a first data frame and a second data frame, where each data frame carries information used to indicate the pilot group determined by the UE.

The sending unit 920 is configured to send a plurality of resource blocks to the network device, where a first resource block carries the first pilot and the first data frame, and a second resource block carries the second pilot and the second data frame.

It should be understood that, for descriptions of the pilot, the pilot group, the pilot group element, the unit time, and the resource block, reference may be made to the foregoing embodiments. Details are not described herein again.

Optionally, in an implementation, the signaling from the network device is master information block (MIB) or system information block (SIB) signaling, or signaling in another format.

Further, the information used to indicate the pilot group configuration may be a table number. For a specific implementation solution, refer to the descriptions in Embodiment 1. It should be understood that the UE 900 further includes a storage unit 940, configured to store the information of the pilot group configuration. The information of the pilot group configuration includes a pilot group number and a pilot group.

Optionally, in one embodiment, the processing unit 910 is further configured to obtain a pilot based on the pilot group. For a specific implementation solution, refer to the descriptions in Embodiment 1. Details are not described herein again.

It should be understood that the storage unit 940 is further configured to store a table of a mapping relationship between a pilot number and a pilot.

Further, when the data frame is a frame in a user-defined format, the information used to indicate the pilot group may be encapsulated in a payload field of the data frame.

Further, when the data frame is a MAC entity frame, the information used to indicate the pilot group may be encapsulated in a MAC control element field of the MAC entity frame.

It should be understood that this embodiment of the present application is an apparatus embodiment corresponding to the method embodiment 1, and descriptions of the method embodiment 1 are also applicable to this embodiment of the present application.

In this embodiment of the present application, the user equipment sends the pilot group to the network device, so that when pilot collision occurs, the network device obtains pilots and channels of UEs based on pilot group information, and further decodes data, thereby effectively resolving a technical problem that decoding cannot be performed when pilot collision occurs.

Embodiment 6

Figure 10:
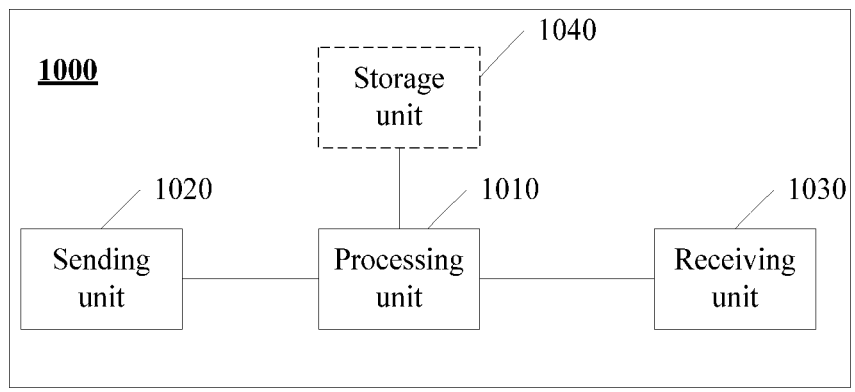
FIG. 10 is a schematic structural diagram of user equipment UE according to another embodiment of the present application.

FIG. 10 is a simplified function block diagram of user equipment UE according to another embodiment of the present application. The user equipment 1000 includes a processing unit 1010, a sending unit 1020, and a receiving unit 1030.

The receiving unit 1030 is configured to receive signaling from a network device, where the signaling carries information used to indicate a pilot group configuration.

The processing unit 1010 is configured to determine a pilot group based on the information used to indicate the pilot group configuration, where the pilot group includes at least two elements, the first element is used to indicate a first pilot sent by the UE in a first unit time, and the second element is used to indicate a second pilot sent by the UE in a second unit time.

The processing unit 1010 is further configured to generate a plurality of data frames including a first data frame and a second data frame, where each data frame carries information used to indicate the pilot group determined by the UE.

The sending unit 1020 is configured to send a plurality of resource blocks to the network device, where a first resource block carries the first pilot and the first data frame, and a second resource block carries the second pilot and the second data frame.

It should be understood that, for descriptions of the pilot, the pilot group, the pilot group element, the unit time, and the resource block, reference may be made to the foregoing embodiments. Details are not described herein again.

Optionally, in one embodiment, the UE 1000 further includes a storage unit 1040, configured to store the information of the pilot group configuration. The information of the pilot group configuration includes two pieces of content: a number of a pilot group configuration mode and a quantity of pilot group elements. Optionally, in one embodiment, the information of the pilot group configuration may further include a quantity of available pilot resources. For detailed descriptions, refer to the descriptions in Embodiment 2.

Optionally, in one embodiment, the processing unit 1010 is further configured to: obtain the quantity of pilot group elements based on the number of the pilot group configuration mode; and determine the pilot group based on a pilot group number and the obtained quantity of pilot group elements.

Optionally, in one embodiment, the processing unit 1010 is further configured to determine the pilot group based on the pilot group number, the obtained quantity of pilot group elements, and the quantity of available pilot resources.

Further, the storage unit 1040 may be further configured to store a table of a mapping relationship between a pilot group number and a pilot group.

Further, the storage unit 1040 may be further configured to store a mapping relationship between a pilot number and a pilot.

Optionally, the storage unit 1040 may be further configured to execute:

$SIndex(z) = \lfloor GIndex/SNumber^{z-1} \rfloor;$ $SIndex(z-1) = \lfloor (GIndex \bmod SNumber^{z-1})/SNumber^{z-2} \rfloor;$ and $SIndex(i) = \lfloor (GIndex \bmod SNumber^{i})/SNumber^{i-1} \rfloor,$
$i=1,2\ldots z,$ where GIndex is the pilot group number, z is the quantity of pilot group elements, SNumber is a quantity of pilot resources, SIndex(i) is a pilot group element, and {SIndex(z), SIndex(z-1), SIndex(i) . . . , SIndex(1)} is the pilot group.

Optionally, in one embodiment, the processing unit 1010 is further configured to obtain a pilot based on the pilot group. For a specific process, refer to the descriptions in Embodiment 2. Details are not described herein again. It should be understood that this embodiment of the present application is an apparatus embodiment for the method embodiment 2, and descriptions of the method embodiment 2 are also applicable to this embodiment of the present application.

In an embodiment of the present application, the user equipment sends the pilot group to the network device, so that when pilot collision occurs, the network device obtains pilots and channels of UEs based on pilot group information, and further decodes data, thereby effectively resolving a technical problem that decoding cannot be performed when pilot collision occurs.

Embodiment 7

Figure 11:
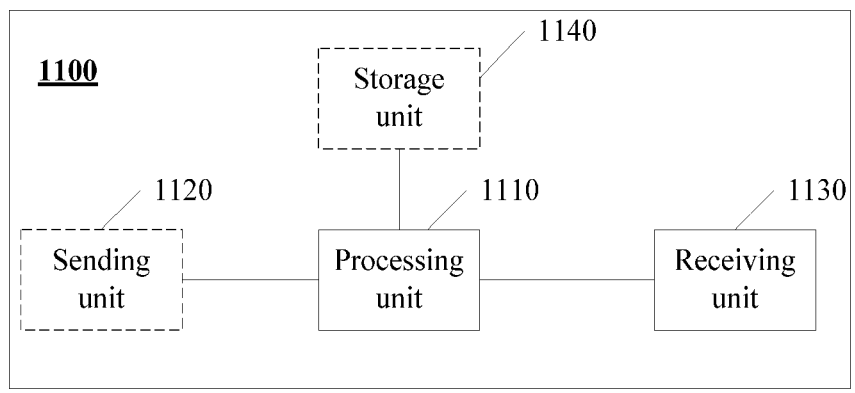
FIG. 11 is a schematic structural diagram of user equipment UE according to another embodiment of the present application.

FIG. 11 is a simplified function block diagram of user equipment UE according to another embodiment of the present application. The user equipment 1100 includes a processing unit 1110 and a sending unit 1120.

The processing unit 1110 is configured to: generate a pilot group, where the pilot group includes at least two elements, a first element is used to indicate a first pilot sent by the UE in a first unit time, and a second element indicates a second pilot sent by the UE in a second unit time; and generate a plurality of data frames including a first data frame and a second data frame, where each data frame carries information used to indicate the pilot group.

The sending unit 1120 is configured to send a plurality of resource blocks to the network device, where a first resource block carries the first pilot and the first data frame, and a second resource block carries the second pilot and the second data frame.

Optionally, in one embodiment, the user equipment 1100 further includes a storage unit 1140, configured to store a table of a mapping relationship between a pilot number and a pilot.

Optionally, in one embodiment, the processing unit 1110 is further configured to obtain a pilot based on the table of a mapping relationship between a pilot number and a pilot.

It should be understood that this embodiment of the present application is an apparatus embodiment for the method embodiment 3, and descriptions of the method embodiment 3 are also applicable to this embodiment of the present application.

In this embodiment of the present application, the user equipment sends the pilot group to the network device, so that the network device obtains pilot groups of at least some UEs, further obtains pilot groups of all UEs, further obtains channel estimation of the UEs, and further decodes data transmitted by the UEs in unit time, thereby effectively resolving a technical problem that decoding cannot be performed due to collision of some pilots.

Embodiment 8

Figure 12:
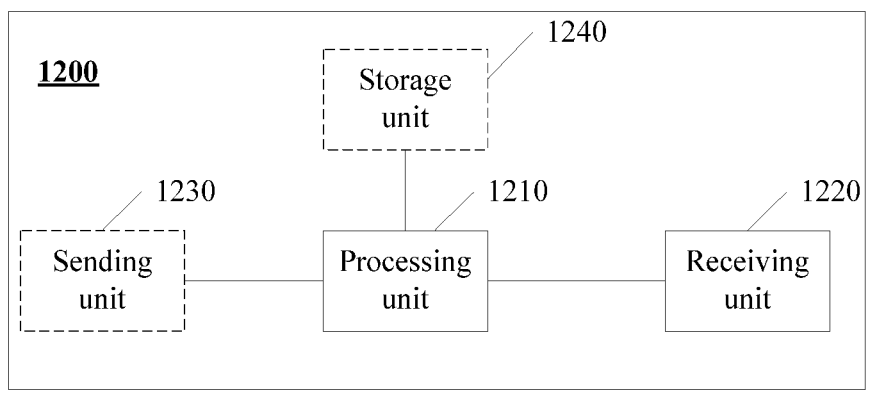
FIG. 12 is a schematic structural diagram of a network device according to an embodiment of the present application.

FIG. 12 is a schematic structural diagram of a network device according to another embodiment of the present application. As shown in FIG. 12, the network device 1200 includes a processing unit 1210 and a receiving unit 1220. Details are as follows:

The receiving unit 1220 is configured to receive a plurality of resource blocks from a plurality of user equipments UEs, where each resource block carries a pilot and a data frame of one or more of the UEs, and each data frame carries information used to indicate a pilot group of one UE.

The processing unit 1210 is configured to: obtain pilot groups determined by at least some of the UEs, where the pilot group includes at least two elements, the first element is used to indicate a first pilot sent by the UE in a first unit time, and the second element is used to indicate a second pilot sent by the UE in a second unit time; and decode data frames of the plurality of UEs based on the pilot groups determined by the at least some of the UEs.

In an implementation, the processing unit 1210 is configured to configure a plurality of pilot groups.

Optionally, in one embodiment, the network device 1200 further includes a sending unit 1230, configured to broadcast signaling to the plurality of UEs, where the signaling carries information used to indicate a pilot group configuration.

Optionally, in one embodiment, the information used to indicate the pilot group configuration may be a table number or a number of a pilot group configuration mode.

Optionally, in one embodiment, the network device 1200 further includes a storage unit 1240, configured to store the information of the pilot group configuration, where the information of the pilot group configuration includes at least a number of a pilot group configuration mode and a quantity of pilot group elements.

Optionally, in one embodiment, the network device 1200 further includes a storage unit 1240, configured to store the information of the pilot group configuration, where the information of the pilot group configuration includes at least a pilot group number and a pilot group.

Optionally, in one embodiment, the processing unit 1210 is further configured to: detect the plurality of resource blocks, and decode a resource block not subject to pilot collision, to obtain a first data frame; and obtain a pilot group of first UE based on an identifier ID of the first UE that is carried in the obtained first data frame.

Optionally, in one embodiment, the processing unit 1210 is further configured to: perform a modulo operation based on the ID of the first UE and a quantity of pilot groups, or perform a modulo operation based on a quantity of pilot groups and a sum of the ID of the first UE and a system frame number SFN, to obtain the pilot group number; and obtain the pilot group of the first UE based on the quantity of pilot group elements and the obtained pilot group number.

Optionally, in one embodiment, the processing unit 1210 is further configured to: obtain the quantity of pilot group elements based on a number of a pilot group configuration mode of the first UE; and obtain the pilot group of the first UE based on the pilot group number and the obtained quantity of pilot group elements.

Optionally, in one embodiment, the processing unit 1210 is further configured to obtain the pilot group of the first UE based on the pilot group number, the obtained quantity of pilot group elements, and a quantity of available pilot resources.

Optionally, in one embodiment, the storage unit 1240 is further configured to store a mapping relationship between a pilot number and a pilot.

Optionally, in one embodiment, the processing unit 1210 is further configured to execute:

$SIndex(z) = \lfloor GIndex/SNumber^{z-1} \rfloor$;

$SIndex(z-1) = \lfloor (GIndex \bmod SNumber^{z-1})/SNumber^{z-2} \rfloor$; and $SIndex(i) = \lfloor (GIndex \bmod SNumber^{i})/SNumber^{i-1} \rfloor$, $i = 1, 2 \ldots z$, where GIndex is the pilot group number, z is the quantity of pilot group elements, SNumber is a quantity of pilot resources, SIndex(i) is a pilot group element, and {SIndex(z), SIndex(z-1), SIndex(i) ..., SIndex(1)} is the pilot group.

Optionally, in one embodiment, the processing unit 1210 is further configured to:
perform a modulo operation on an identifier ID of the UE and the quantity of pilot groups, or perform a modulo operation on the quantity of pilot groups and a sum of an identifier ID of the UE and the system frame number SFN, to obtain a pilot group number; and
obtain, based on a specific algorithm, a pilot group corresponding to the pilot group number.

In an implementation, the processing unit 1210 is further configured to:
obtain, based on the pilot group of the first UE, pilots transmitted by the first UE in unit time;
multiplex a pilot, of the first UE, whose data is correctly decoded to a pilot subject to collision, where the multiplexing includes determining the pilot subject to collision and channel quality;
perform pilot interference cancellation on the pilot subject to collision, to eliminate the multiplexed pilot signal;
detect a pilot obtained after the interference cancellation, and estimate channel quality; and
decode data corresponding to the pilot subject to collision.

Optionally, in another embodiment, the network device 1200 further includes a sending unit 1230. The sending unit 1230 is configured to send signaling to the UE, where the signaling carries information used to indicate a pilot group configuration. For the information used to indicate the pilot group configuration, refer to the descriptions in Embodiment 1 to Embodiment 4. Details are not described herein again.

In an implementation, the pilot group element is a pilot identifier or a pilot number.

In another implementation, the pilot group element is one or more parameters.

Optionally, in one embodiment, the signaling may be an MIB or a SIB.

For descriptions of the pilot, the pilot group, the pilot group element, the unit time, and the resource block, refer to the foregoing embodiments. Details are not described herein again.

It should be understood that this embodiment of the present application is an apparatus embodiment corresponding to the method embodiment 4, and explanations and descriptions of the method embodiment 4 are also applicable to this embodiment of the present application. Details are not described herein again.

It should be understood that the user equipments in FIG. 9 to FIG. 11 and the network device in FIG. 12 are presented in a form of functional units. When there is no limitation, the term "unit" used in the specification may be an application-specific integrated circuit (ASIC), an electronic circuit, a (shared, dedicated, or group) processor, a memory, or a combined logic circuit that executes one or more software or firmware programs, and/or another proper component that provides the function.

Embodiment 9

Figure 13:
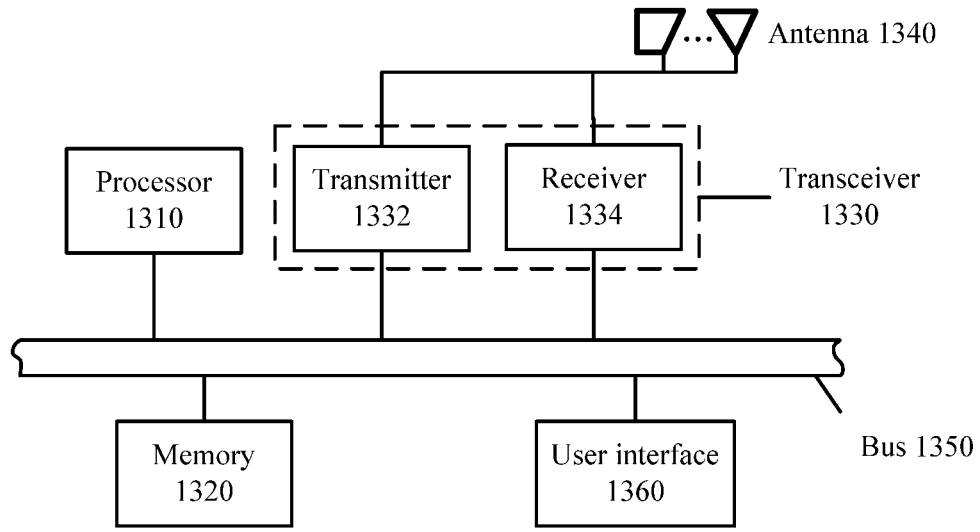
FIG. 13 is a schematic structural diagram of a network element according to an embodiment of the present application.

FIG. 13 is a schematic block diagram of a network element according to another embodiment of the present application. The network element 1300 includes a processor 1310, a memory 1320, a transceiver 1330, an antenna 1340, a bus 1350, and a user interface 1360.

Specifically, the processor 1310 controls an operation of the network element 1300. The processor may be a general-purpose processor, a digital signal processor, an application-specific integrated circuit, a field programmable gate array, or another programmable logic device.

The transceiver 1330 can include a transmitter 1332 and a receiver 1334. The transmitter 1332 is configured to transmit a signal, and the receiver 1334 is configured to receive a signal. There may be one or more antennas 1340. The network element 1300 may further include the user interface 1360, such as a keyboard, a microphone, a speaker, and/or a touchscreen. The user interface 1360 may transfer content and a control operation to the network element 1300.

The components of the network element 1300 are coupled together using the bus 1350. In addition to a data bus, the bus 1350 further includes a power bus, a control bus, and a state signal bus. However, for clarity of description, various buses are marked as the bus system 1350 in the figure. It should be noted that the foregoing descriptions of a network element structure may be applied to the embodiments of the present application.

The memory 1320 may include a read only memory (Read Only Memory, ROM) and a random access memory (Random Access Memory, RAM), or may be another type of dynamic storage device that can store information and an instruction, or may be a magnetic disk storage. The memory 1320 may be configured to store an instruction that implements the related method provided in the embodiments of the present application. It may be understood that an executable instruction is programmed or loaded to the processor 1310 of the network element 1300 through at least one of temporary storage and long-term storage.

In an embodiment, the memory is configured to store computer-executable program code. When the program code includes an instruction and the processor executes the instruction, the instruction enables the network element to perform the following operations:

receiving signaling from a network device, where the signaling carries information used to indicate a pilot group configuration;

determining a pilot group based on the information used to indicate the pilot group configuration, where the pilot group includes at least two elements, a first element is used to indicate a first pilot transmitted by UE in a first unit time, and a second element indicates a second pilot transmitted by the UE in a second unit time;

generating a plurality of data frames including a first data frame and a second data frame, where each data frame carries information used to indicate the pilot group determined by the UE; and sending a plurality of resource blocks to the network device, where a first resource block carries the first pilot and the first data frame, and a second resource block carries the second pilot and the second data frame.

Alternatively, in another embodiment, the memory is configured to store computer-executable program code. When the program code includes an instruction and the processor executes the instruction, the instruction enables the network element to perform the following operations:

generating a pilot group, where the pilot group includes at least two elements, a first element is used to indicate a first pilot sent by UE in a first unit time, and a second element indicates a second pilot sent by the UE in a second unit time;

generating a plurality of data frames including a first data frame and a second data frame, where each data frame carries information used to indicate the pilot group; and sending a plurality of resource blocks to a network device, where a first resource block carries the first pilot and the first data frame, and a second resource block carries the second pilot and the second data frame.

For a specific implementation of the operations performed by the processor included in the network element that is used as the user equipment UE, refer to corresponding operations performed by the UE in Embodiment 1 to Embodiment 3. Details are not described in this embodiment of the present application again.

Embodiment 10

Figure 14:
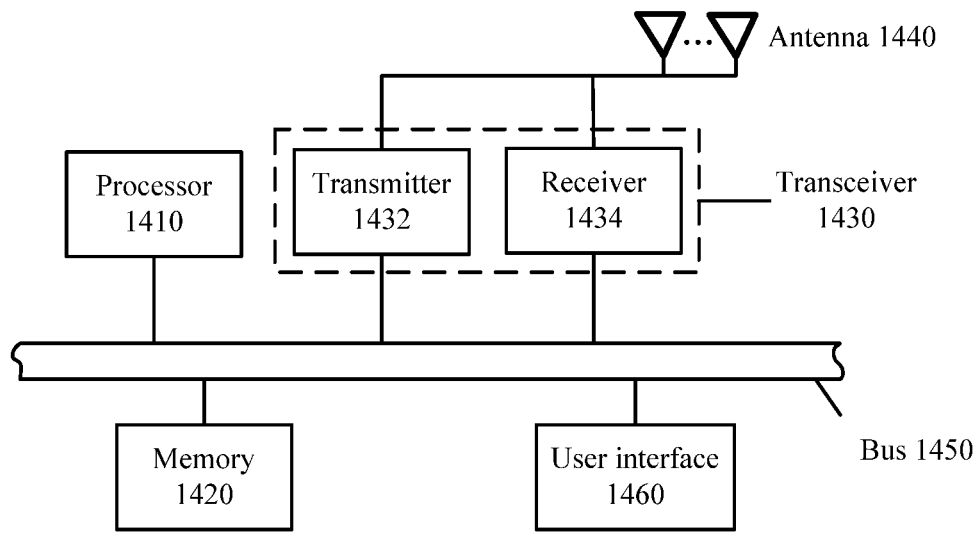
FIG. 14 is a schematic structural diagram of a network element according to an embodiment of the present application.

FIG. 14 is a schematic block diagram of a network element according to another embodiment of the present application. The network element 1400 includes a processor 1410, a memory 1420, a transceiver 1430, an antenna 1440, a bus 1450, and a user interface 1460.

Specifically, the processor 1410 controls an operation of the network element 1400. The processor may be a general-purpose processor, a digital signal processor, an application-specific integrated circuit, a field programmable gate array, or another programmable logic device.

The transceiver 1430 includes a transmitter 1432 and a receiver 1434. The transmitter 1432 is configured to transmit a signal, and the receiver 1434 is configured to receive a signal. There may be one or more antennas 1440. The network element 1400 may further include the user interface 1460, such as a keyboard, a microphone, a speaker, and/or a touchscreen. The user interface 1460 may transfer content and a control operation to the network element 1400.

The components of the network element 1400 are coupled together using the bus 1450. In addition to a data bus, the bus system 1450 further includes a power bus, a control bus, and a state signal bus. However, for clarity of description, various buses are marked as the bus system 1450 in the figure. It should be noted that the foregoing descriptions of a network element structure may be applied to the embodiments of the present application.

The memory 1420 may include a read only memory (ROM) and a random access memory (RAM), or may be another type of dynamic storage device that can store information and an instruction, or may be a magnetic disk storage. The memory 1420 may be configured to store an instruction that implements the related method provided in the embodiments of the present application. It may be understood that an executable instruction is programmed or loaded to the processor 1410 of the network element 1400 through at least one of temporary storage and long-term storage. In an embodiment, the memory is configured to store computer-executable program code. When the program code includes an instruction and the processor executes the instruction, the instruction enables the network element to perform the following operations:

receiving a plurality of resource blocks from a plurality of user equipments UE, where each resource block carries a pilot and a data frame of one or more of the UEs, and each data frame carries information used to indicate a pilot group of one UE;

obtaining pilot groups determined by at least some of the UEs, where the pilot group includes at least two elements, the first element is used to indicate a first pilot sent by the UE in a first unit time, and the second element is used to indicate a second pilot sent by the UE in a second unit time; and obtaining pilots of the plurality of user equipments based on the pilot groups determined by the at least some of the UEs.

For an implementation of the operations performed by the processor included in the network element that is used as a network device, refer to corresponding operations performed by the network device in Embodiment 4. Details are not described in this embodiment of the present application again.

An embodiment of the present application further provides a computer storage medium, configured to store a computer software instruction used by user equipment. The computer software instruction includes a program designed to perform the foregoing aspects.

An embodiment of the present application further provides a computer storage medium, configured to store a computer software instruction used by the foregoing network device. The computer software instruction includes a program designed to perform the foregoing aspects.

An embodiment of the present application further provides a communications network system, including user equipment UE and a network device. The network device is connected to a plurality of UEs using a wireless network. The plurality of UEs are configured to send a plurality of resource blocks to the network device. Each resource block carries a pilot and a data frame of one or more of the UEs. The data frame carries information used to indicate a pilot group determined by one UE. The pilot group includes at least two elements, the first element is used to indicate a first pilot sent by the UE in a first unit time, and the second element is used to indicate a second pilot sent by the UE in a second unit time.

The network device is configured to: receive the plurality of resource blocks from the plurality of UEs, obtain the pilot groups determined by the at least some of the UEs, and decode data frames of the plurality of UEs based on the pilot groups determined by the at least some of the UEs.

For an interaction process between the UE and the network device, refer to Embodiment 1 to Embodiment 4. Details are not described herein again.

In one embodiment, after determining the information of the pilot group, the user equipment sends, to the network device using the resource blocks, the information indicating the pilot group, so that the network device obtains pilot groups of at least some UEs, further obtains pilots transmitted by all UEs in unit time, and further decodes data transmitted by the UEs in the unit time, thereby effectively resolving a technical problem that decoding cannot be performed due to pilot collision.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of the present application, but are not intended to limit the present application. Any modification, equivalent replacement, and improvement made without departing from the spirit and principle of the present application shall fall within the protection scope of the present application.

What is claimed is:

1. A data processing method, comprising:
    determining a pilot group, wherein the pilot group comprises at least two elements, including a first element used to indicate a first pilot sent by user equipment (UE) in a first unit time, and a second element used to indicate a second pilot sent by the UE in a second unit time;
    generating a plurality of data frames comprising a first data frame and a second data frame, wherein each data frame carries information used to indicate the pilot group; and
    sending a plurality of resource blocks to a network device, including a first resource block and a second resource block, wherein the first resource block carries the first pilot and the first data frame, and the second resource block carries the second pilot and the second data frame;
    wherein determining the pilot group comprises:
        receiving signaling from the network device, wherein the signaling carries information used to indicate a pilot group configuration, wherein the information used to indicate the pilot group configuration is a number indicating a pilot group configuration mode; and
        determining the pilot group based on the information used to indicate the pilot group configuration, including:
            obtaining a quantity of pilot group elements based on the number of the pilot group configuration mode; and
            determining the pilot group based on a pilot group number and the obtained quantity of pilot group elements;
    wherein the pilot group number is obtained by performing a modulo operation based on a quantity of pilot groups and a sum of an identifier (ID) of the UE and a system frame number (SFN).

2. The method according to claim 1, wherein determining the pilot group based on a pilot group number and the obtained quantity of pilot group elements comprises:
    determining the pilot group based on the pilot group number, the obtained quantity of pilot group elements, and a quantity of available pilot resources.

3. A user equipment (UE), comprising:
    a processing unit, configured to: determine a pilot group, wherein the pilot group comprises at least two elements, including a first element used to indicate a first pilot sent by the user equipment (UE) in a first unit time and a second element used to indicate a second pilot sent by the UE in a second unit time; and generate a plurality of data frames comprising a first data frame and a second data frame, wherein each data frame carries information used to indicate the pilot group;
    a sending unit, configured to send a plurality of resource blocks to a network device, including a first resource block and a second resource block, wherein the first resource block carries the first pilot and the first data frame, and the second resource block carries the second pilot and the second data frame; and
    a receiving unit, configured to receive signaling from the network device, wherein the signaling carries information used to indicate a pilot group configuration, wherein the information used to indicate the pilot group configuration is a number indicating the pilot group configuration mode;
    wherein the processing unit is configured to determine the pilot group based on the information indicating the pilot group configuration, including:

obtaining a quantity of pilot group elements based on the number of the pilot group configuration mode; and determining the pilot group based on a pilot group number and the obtained quantity of pilot group elements;

wherein the pilot group number is obtained by performing a modulo operation based on a quantity of pilot groups and a sum of an identifier (ID) of the UE and a system frame number (SFN).

4. The UE according to claim 3, wherein the processing unit is configured to:

determine the pilot group based on the pilot group number, the obtained quantity of pilot group elements, and a quantity of available pilot resources.

5. A network device, comprising:

a receiving unit, configured to receive a plurality of resource blocks from a plurality of user equipments (UEs), wherein each resource block carries a pilot and a data frame of one or more of the UEs, and each data frame carries information used to indicate a pilot group of one UE, wherein the information used to indicate the pilot group of the UE is an identifier (ID) of the UE; and a processing unit, configured to: obtain pilot groups of at least some of the UEs, wherein each pilot group comprises at least two elements, including a first element used to indicate a first pilot transmitted by corresponding UE in a first unit time and a second element used to indicate a second pilot transmitted by the corresponding UE in a second unit time; and decode data frames of the plurality of UEs based on the pilot groups determined by the at least some of the UEs;

wherein the processing unit is configured to:

detect the plurality of resource blocks, and decode a resource block not subject to pilot collision, to obtain a first data frame; and obtain a pilot group of first UE based on an ID of the first UE that is carried in the obtained first data frame, including:

performing a modulo operation based on the ID of the first UE and a quantity of pilot groups, or performing a modulo operation based on a quantity of pilot groups and a sum of the ID of the first UE and a system frame number (SFN), to obtain the pilot group number; and obtaining the pilot group of the first UE based on a quantity of pilot group elements and the obtained pilot group number.

6. The network device according to claim 5, wherein the method further comprises a sending unit, configured to broadcast signaling to the first UE, wherein the signaling carries a number of a pilot group configuration mode of the first UE.

* * * * *